United States Patent [19]
Branecky et al.

[11] 3,935,429
[45] Jan. 27, 1976

[54] PROCESS AND APPARATUS FOR CONTROLLING DOCUMENT FEEDING MACHINES FROM INDICIA CONTAINED ON A DOCUMENT FED THEREFROM

[75] Inventors: George N. Branecky, Bethel; Gary R. Sochrin, Shelton, both of Conn.

[73] Assignee: Pitney-Bowes, Inc., Stamford, Conn.

[22] Filed: Feb. 18, 1975

[21] Appl. No.: 550,871

[52] U.S. Cl........ 235/61.11 E; 209/DIG. 1; 250/566
[51] Int. Cl.²... G06K 7/10; B07C 5/38; G08C 9/06
[58] Field of Search....... 235/61.11 E, 151.2, 151.3, 235/151.32; 209/110.5, 111.5, DIG. 1; 198/DIG. 16; 214/1 PE, 1 C; 226/20, 2; 250/566, 568, 569

[56] References Cited
UNITED STATES PATENTS

| | | | |
|---|---|---|---|
| 3,652,828 | 3/1972 | Sather et al. | 209/DIG. 1 |
| 3,757,942 | 9/1973 | Gunn | 235/61.12 M |
| 3,864,559 | 2/1975 | Mori et al. | 235/61.11 E |

*Primary Examiner*—Daryl W. Cook
*Attorney, Agent, or Firm*—William D. Soltow, Jr.; Albert W. Scribner; Robert S. Salzman

[57] ABSTRACT

A process and apparatus are provided for controlling a document inserting machine having a plurality of operating stations therein, one of which includes a high speed feeder for feeding documents bearing control function indicia thereon. The process involves detecting the leading edge of the document and generating time signals in accordance with the speed of the document through the feeder. The control function indicia are scanned for generating control function data bits therefrom which are stored and recycled on the occurrence of a first data bit, thereby converting the time measurement to a distance measurement which provides a means for producing accurate distance measurements between the occurrence of a first data bit and subsequent data bits based on the control function indicia on the document. Scanning zones or windows are formed under the control of the distance measurement between the first data bit and subsequent data bits, which windows provide outputs on the occurrence of a data bit occurring in a particular window, which signals may be used to provide control functions for the plurality of operations of the apparatus. One form of apparatus is illustrated for carrying out the aforesaid process.

10 Claims, 7 Drawing Figures

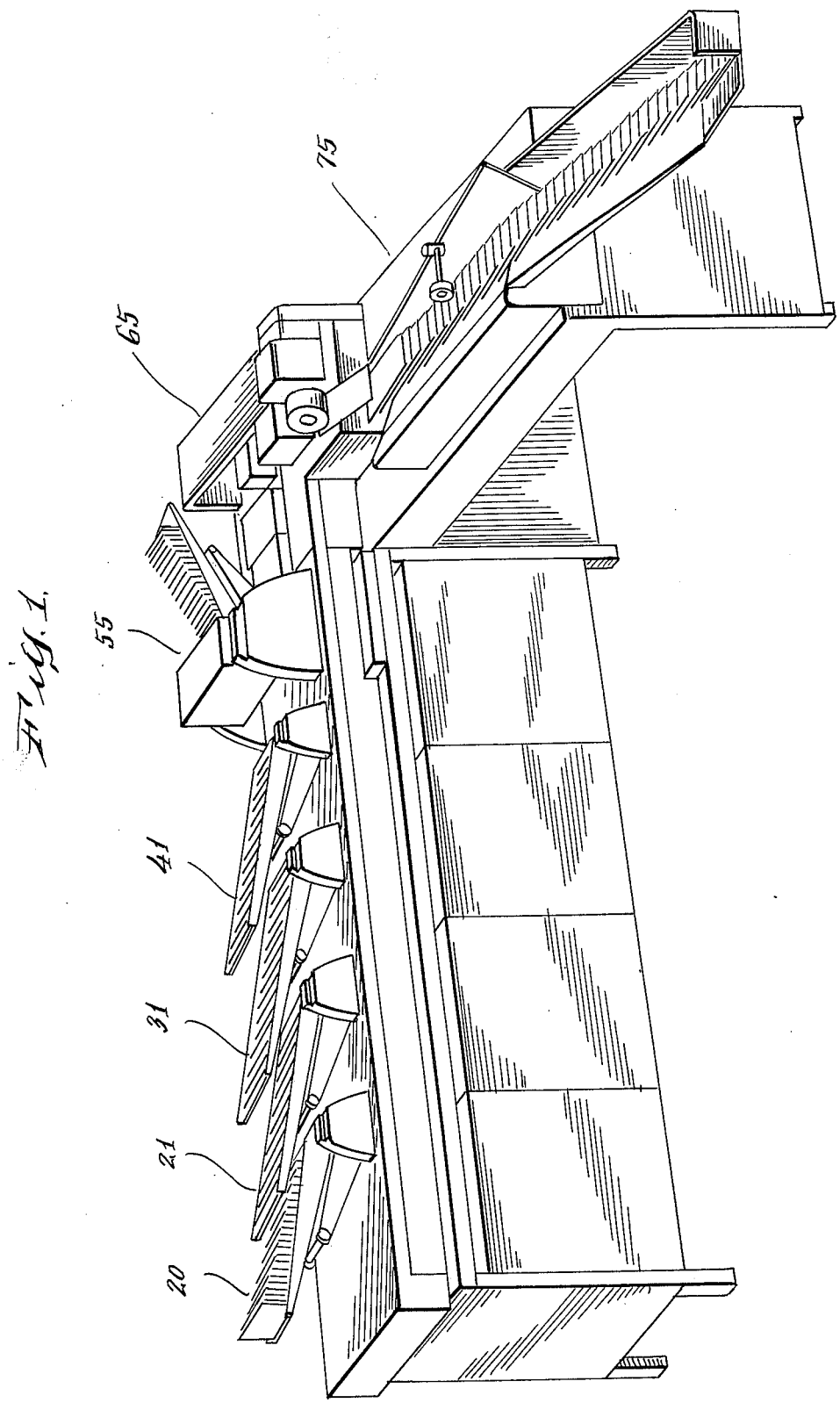

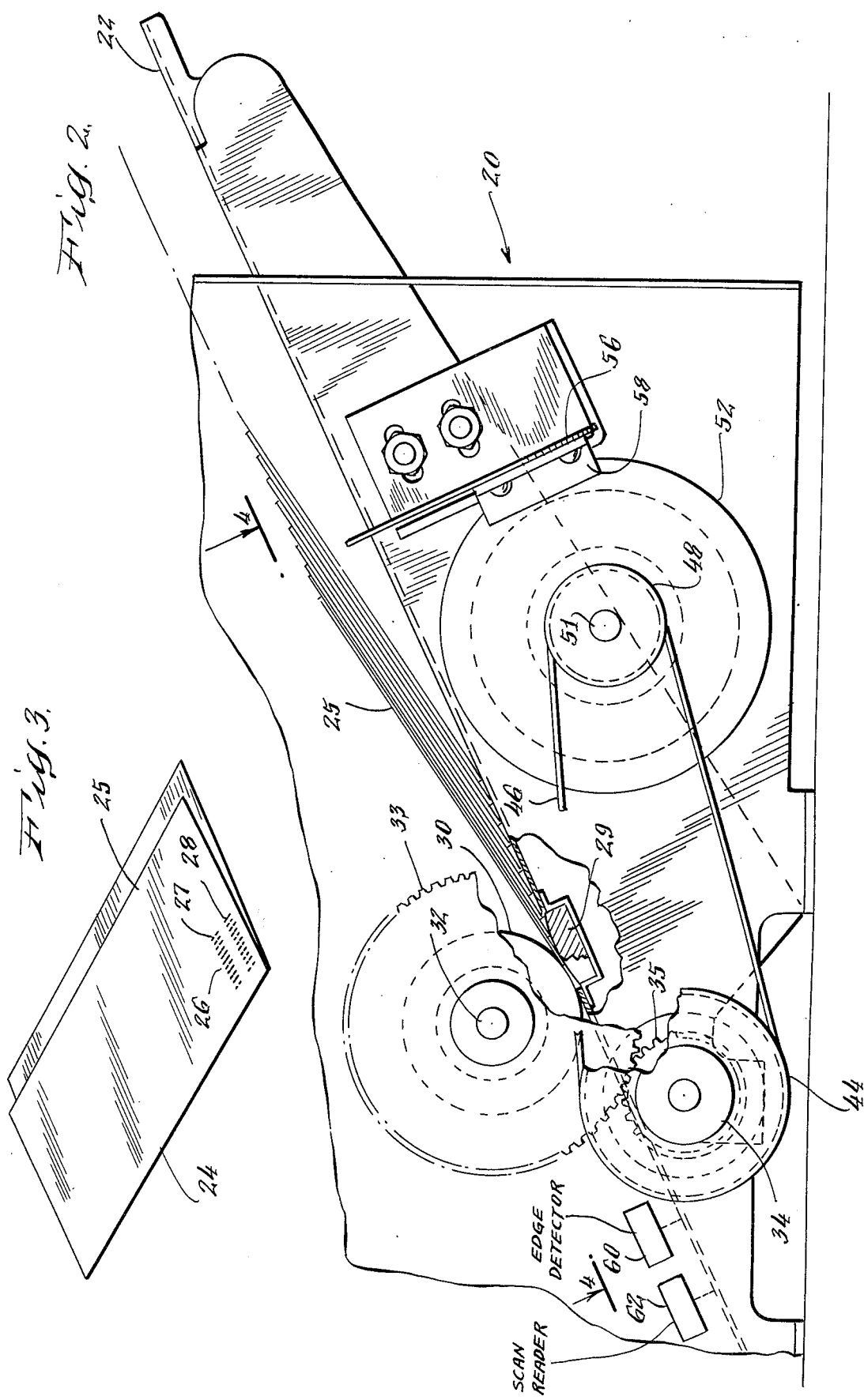

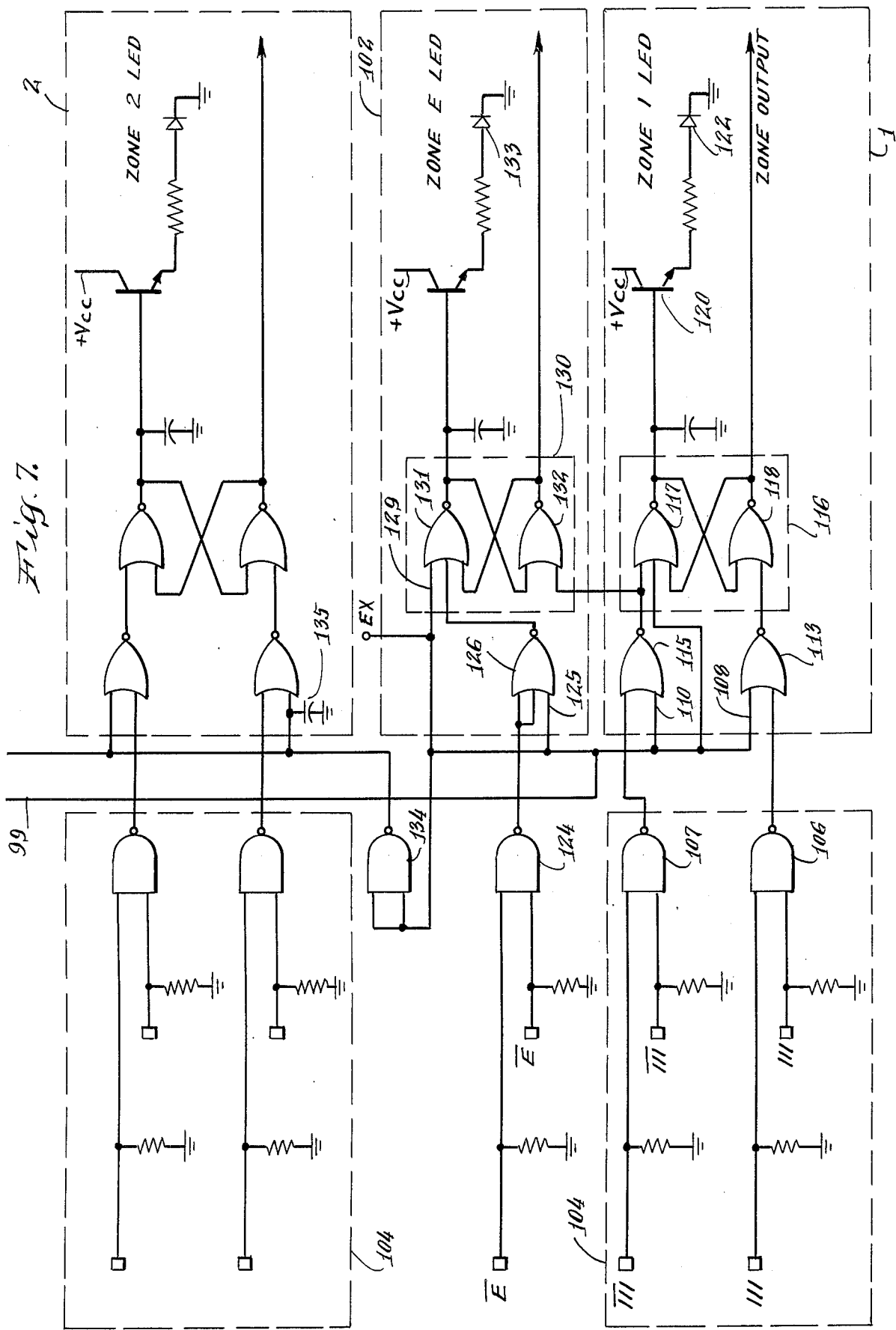

PROCESS AND APPARATUS FOR CONTROLLING DOCUMENT FEEDING MACHINES FROM INDICIA CONTAINED ON A DOCUMENT FED THEREFROM

BACKGROUND OF THE INVENTION

This invention relates to a process and apparatus suitable for controlling the operation of a multiple station document handling machine, for example, a mail inserting machine.

Multiple station inserting machines, for example of the model 3100 series manufactured by Pitney Bowes, Stamford, Conn., perform the function of feeding a plurality of enclosures from different feeders and inserting them into an envelope. When combined with a mailing machine and a power stacker, the machine automatically prepares an envelope for mailing by inserting all the contents into the envelope, sealing the flap of the envelope, and meter stamping the required postage and stacking stuffed envelopes so assembled. For many applications a special high-speed feeder is provided in place of one of the standard feeders for providing the capability of feeding many enclosures during each cycle of the machine. The special high-speed feeder has documents fed therethrough which contain control function indicia thereon, which are scanned to provide control function signals to insure the proper machine timing and control functions. The control function indicia may be printed on one or more rows, the position of the indicia being determined by the row and by the distance from the lead edge of the document which, when scanned, represents a bit weight or specific control function. For example, the appearance of control function indicia on the document at predetermined locations thereon can provide select control feed from feeder Nos. 1, 2, 3, etc., provide for the selection of an even number of pages from the high speed feeder, provide a stop-and-lock function, provide indication of the end of a zip code group and that the envelope which designates the end of the group will be offset on an associated stacker, etc. The control function indicia are accurately spaced from the lead edge of the control function indicia bearing document, as well as accurately spaced with respect to each other. Although all of the control function indicia are accurately printed with respect to one another, and the lead edge of the document, broad tolerances may exist from the lead edge of the document which are caused by poor registration of the document to the printer mechanism which imprints the indicia on the document, improper bursting or uneven edge of the document after printing, poorly folded documents or documents skewed through the feeder in cases where the lead edge of the edge detection circuitry is not in line with the direction of feed of the control function indicia on the document. Of course, the aforesaid problems could produce errors in reading the control function indicia. In reading the control function indicia, scanning zones or data windows are generally provided to read predetermined data bits within given time intervals. Traditionally, data windows are provided by timing the document through the high-speed feeder, by printing a timing track adjacent to the data bit, or by generating a series of sequential lead edge detectors to coincide with the data bits. Timing the document through the feeder has the disadvantage of variation in time caused by the tolerance and the ambient conditions on the timing circuits and the change in speed caused by the speed variations in the feeder itself. The printing timing track is a very accurate method of determining bit windows, but has the disadvantage of requiring additional computer print time, regardless of the presence of data, since every line of print must be made by the line printer. The printed timing track also requires an extra and costly reader. Sequential edge detection is a relatively low cost technique, but requires critical adjustment in alignment of the edge detectors, and makes no allowances for print distance variations from the edge of the document.

SUMMARY OF THE INVENTION

It is an object of the present invention to provide a new and improved process and apparatus for controlling an inserting machine which is accurate, and overcomes the disadvantages of processes and apparatus previously used.

A further object of this invention is to provide a new and novel process and apparatus for a multiple station inserting machine which accurately provides specific control function information from a document having control function indicia thereon, even though such a document is poorly folded, skewed when fed through a feeder, improperly bursted or subject to varying tolerances due to the poor registration of the document on which the control function indicia is prepared.

Still another object of this invention is to provide a new and improved process and apparatus for a multistation inserter which derives control function information from control function indicia appearing on a document fed through the feeder of an inserter, control functions being generated by converting time into distance, and relating all measurements to a first data bit derived from the indicia and the inhibiting of the inserter if control functions are generated where none should exist, all of which prevents errors in translating the control function indicia.

In carrying out this invention in one illustrative embodiment thereof, a process and apparatus are provided for controlling a mail inserting machine having a plurality of operating feed stations therein, including a high speed feeder for feeding documents bearing control function indicia thereon. The process involves detecting the leading edge of the document as it moves in the high speed feeder, and generating timing signals in accordance with the speed of travel of the document through the feeder. The control function indicia on the document are scanned, generating data bits therefrom in accordance with such indicia. The data bits are stored and used to recycle timing signals on the occurrence of a first data bit, thereby converting the timing signals to distance signals, and providing an accurate distance measurement between the occurrence of the first data bit and subsequent data bits which are detected on the control function indicia on the document. Zones or data windows are formed under control of the distance signals for providing control function outputs therefrom on the occurrence of a data bit in a particular window. The absence of a first data bit sets up an error window which looks for data bits which should not occur. On the occurrence of a data bit during an error window, a control function signal is generated for inhibiting the operation of the inserting machine.

BRIEF DESCRIPTION OF THE DRAWINGS

FIG. 1 shows a multiple station document inserting machine combined with a mailing machine and a power stacker illustrating the type of equipment to which the present invention pertains.

FIG. 2 is a front elevational view of a high speed feeder which may be utilized in the present invention.

FIG. 3 is an isometric view of one form of document bearing control function indicia thereon which may be fed to the feeder shown in FIG. 2 and utilized in the present invention.

FIG. 7 is a schematic diagram of one form of circuitry which may be employed by the zone functions illustrated in block form in FIG. 6.

DESCRIPTION OF THE PREFERRED EMBODIMENTS

Figure 4:
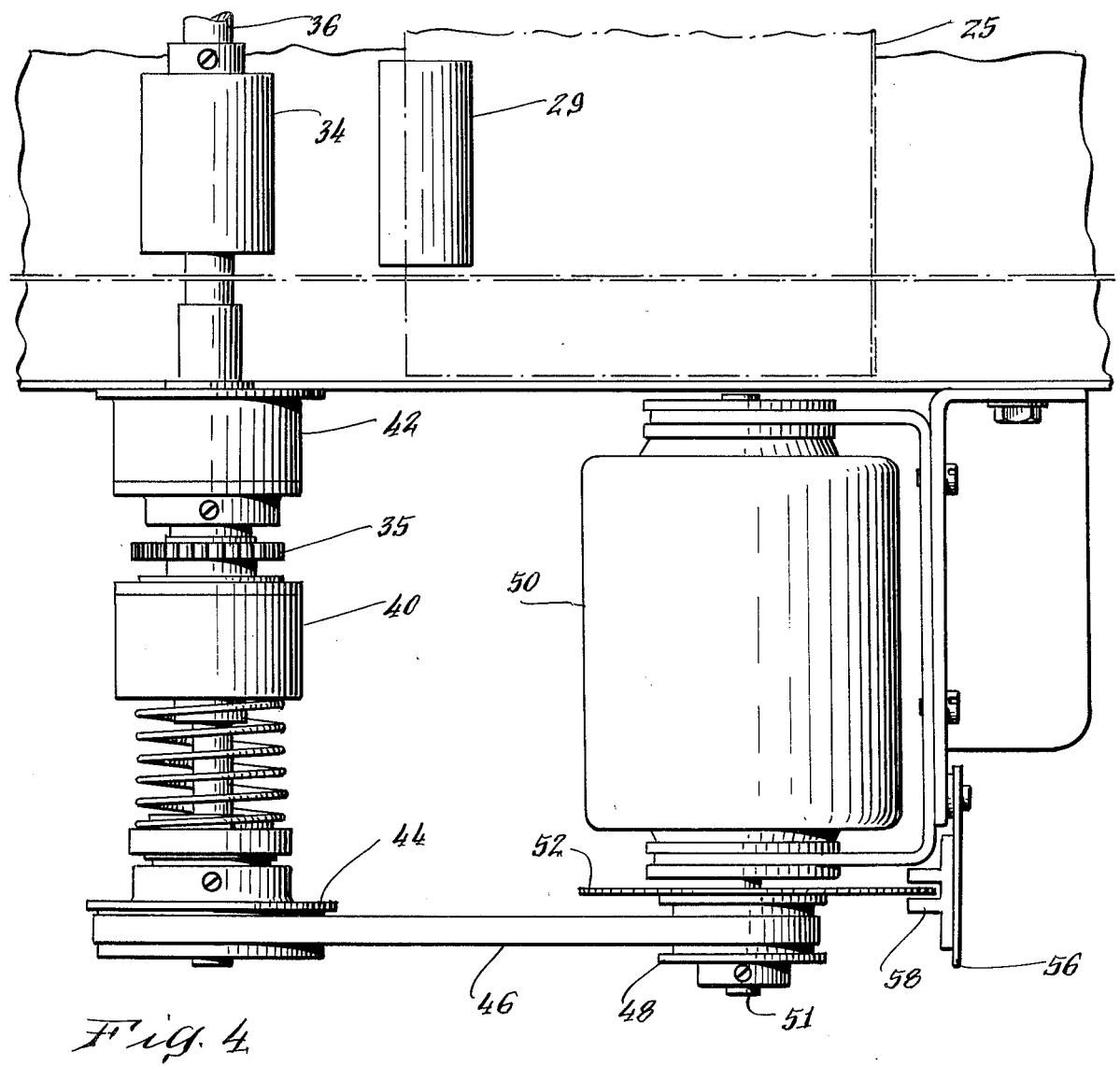
FIG. 4 is a top view taken along the line indicated by the arrows on the feeder station of FIG. 2.

FIG. 1 illustrates a multiple station document inserting machine having a plurality of feeder stations 20, 21, 31, 41, and 55 combined with a mailing machine 65 and a power stacker 75. The inserting machine may be in the Model 3100 series, the mailing machine a Model 4255, and the stacker a Model VPS Power Stacker, all manufactured by Pitney Bowes of Stamford, Conn. The aforesaid equipment functions to feed documents from the feeders 20, 21, 31 and 41 in a controlled predetermined sequence to be inserted in an envelope fed from envelope feeder 55. The envelopes are sealed, meter stamped with the required postage by mailing machine 65 and stacked by power stacker 75. In the present invention, the special high speed feeder 20 shown in FIG. 1 is utilized in place of one of the standard feeders in the aforesaid inserting machine. The inserting machine, so modified, performs the same functions as standard machines, except that the capability of feeding many enclosures during each machine cycle is provided.

Referring now to FIG. 2, which illustrates one type of high speed feeder which may be utilized in the present invention, the high speed feeder being designated with the reference numeral 20, the high speed feeder 20 has a feed deck 22 positioned thereon which carries a plurality of record-bearing mediums or documents 25, for example of the type shown in FIG. 3. The documents 25 are deflected by a separator stone 29 which in cooperation with a separator or main feeder roller 30 supplies the documents 25 one at a time to a demand roller 34. As will best be seen on FIG. 4, the demand roller 34 is mounted for rotation on a split (not illustrated) demand roller shaft 36 which is driven by a pulley 44 via a timing belt 46 and pulley 48 mounted on a motor shaft 51 of a motor 50. The split demand roller shaft 36 also carries a magnetic clutch 40 and a magnetic brake 42 along with the gear 35. When the magnetic clutch 40 is energized, the gear 35 drives the gear 33 (FIG. 2) mounted on a split (not illustrated) separator shaft 32 for driving shaft 32 and the separator roller 30 which, as previously stated, feeds individual documents 25 to the demand roller 34. The brake 42 insures that no motion occurs when the clutch 40 is de-energized.

Figure 5:
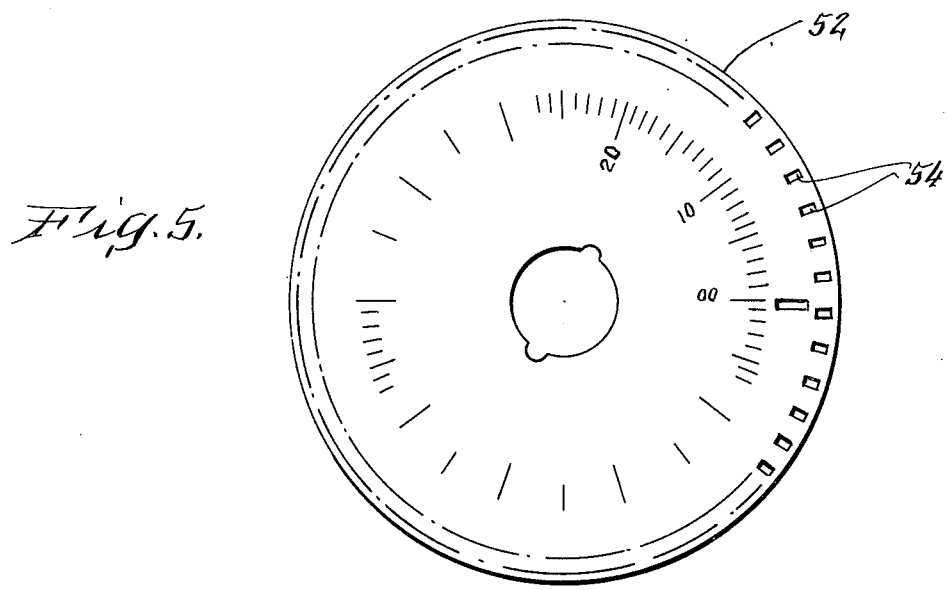
FIG. 5 illustrates one form of encoder disk which may be utilized in the high speed feeder shown in FIG. 2.

As best seen in FIG. 4, the motor 50 drives the motor shaft 51 which also carries an incremental encoder disk 52 of the type shown in FIG. 5. The incremental encoder disk 52 has a plurality of openings 54 around the periphery thereof. An encoder reader 56 having at least one interrupter 58 mounted thereon is positioned around the periphery of the incremental encoder disk 52, the encoder reader 56 generating pulses pursuant to the rotation of the encoder disk 52. The encoder reader 56 may include two interrupters, for example of the type GE H-13-A-1, which generate pulses having a quadrature relationship. If the disk 52 has twice as many openings, only a single interrupter would be required. Since the incremental encoding disc 52 is mechanically coupled via the belt 46 to the high speed feeder 20's demand roller 34, the encoder reader 56 produces pulses at a rate equivalent to the demand roller's surface speed. These pulses are continuous during a machine cycle of operation in which the demand roller 34 is continually turning. The function of these pulses will be described hereinafter.

Returning to FIG. 3, the record-bearing medium or document 25 is illustrated in folded form having a leading folded edge 24. It will be apparent that other forms of documents, such as cards or non-folded documents may be employed. The control function indicia 26 is illustrated as dash marks in a plurality of rows which form vertical columns 27 and 28 thereon. The control function indicia 26 in the form of dash marks are accurately positioned with respect to the leading edge 24 and with respect to each other. The position of the dash mark as determined by row and by distance from the lead edge 24 of the document 25 represents bit weight or specific control function data. The control function indicia 26 may be printed, mechanically punched (folded or depressed), or magnetically or electrostatically marked. The type of marking utilized will determine the type of detection which is utilized in deriving control signals from the control function indicia 26.

Returning now to FIG. 2, a leading edge 24 of document 25 is detected by an edge detector shown schematically by the block 60 in FIG. 2 while the document 25 is in the bite of the demand roller 34. Edge detection may be accomplished by a wide variety of devices from the simplest of switches to the most complex optical devices. One form which might be utilized would be a phototransistor and light-emitting diode pair which would be activated by the leading edge 24 of the document 25. If the document 25 has small holes in it, the edge detector should be constructed to ignore the small holes, and this may be achieved by a large foot on a limit-type switch, by an electrical filter, etc. After edge detection, the control function indicia 26 is scanned by a scan reader shown schematically in FIG. 2 as block 62. The nature of the scan reader 62 will be defined by the type of control function indicia 26 which are employed on the document 25. For example, if dash marks are used for the control function indicia 26, as shown on FIG. 3, a pair of split fiber optical readers may be used to gather reflected light from the columns 27 and 28. The split fiber functions to illuminate one portion thereof and pick up a signal change from the scattering of the light in another portion thereof, the signal change indicating the presence of a mark. As was pointed out, a large variety of devices may be used to gather data, depending on the type of control function indicia on the document. For example, if magnetic marks are used, a magnetic pickup would be utilized to scan and generate signals on the presence of a magnetic mark.

Before proceeding further with a description of additional apparatus and circuitry, a general review of the process involved in the present invention will first be undertaken, so that further descriptions of apparatus and structure will be more meaningful. The control function indicia 26 on the document 25 must be accurately read and interpreted to provide the proper control function signals which are used to control the inserting of other documents by the inserting machine shown in FIG. 1. As has been previously pointed out, various problems exist in accurately reading the indicia, for example, inaccurate document edge, variations in feeding speed of the document through the feeder, etc. In accordance with the present invention, timing pulses from the encoding reader 56 are stored in a counter which counts the timing pulses and provides decimal decoded outputs from them. The decimal decoded outputs are directly derived from the distance of travel of the document 25 on the demand roller 34, thus effectively converting the timing signals to distance signals which are used to program predetermined data windows or scanning zones. These zones are utilized to identify data bits from the control function indicia 26 on the document 25. A first data window is opened under the control of the counter on the detection of the leading edge 24 of the document 25, as it moves through the feeder 20. The detection of the first data bit from the scanner reader 62 resets the counter to zero, inhibits the first data window and an error window, and enables subsequent data windows to open and close in a predetermined programmed sequence as the document moves under the scanner 62. The data windows are under program control of the counter. In effect, the sequential opening of subsequent data windows is accurately spaced from the first data bit whereby the timing pulses have been converted to an accurate distance measurement between the occurrence of a first data bit and all subsequent data bits. If no data bit occurs in the first data window, a large error window opens which scans for data bits where none should be present. On occurrence of a data bit in the error window, a signal is generated to inhibit the machine's operation, because no data bit should be present and an error has been made. On the closing of the last data window or error window, the counter is disabled, and the machine is readied for the next machine cycle. The next machine cycle is initiated when the leading edge of the next document is detected.

Figure 6:
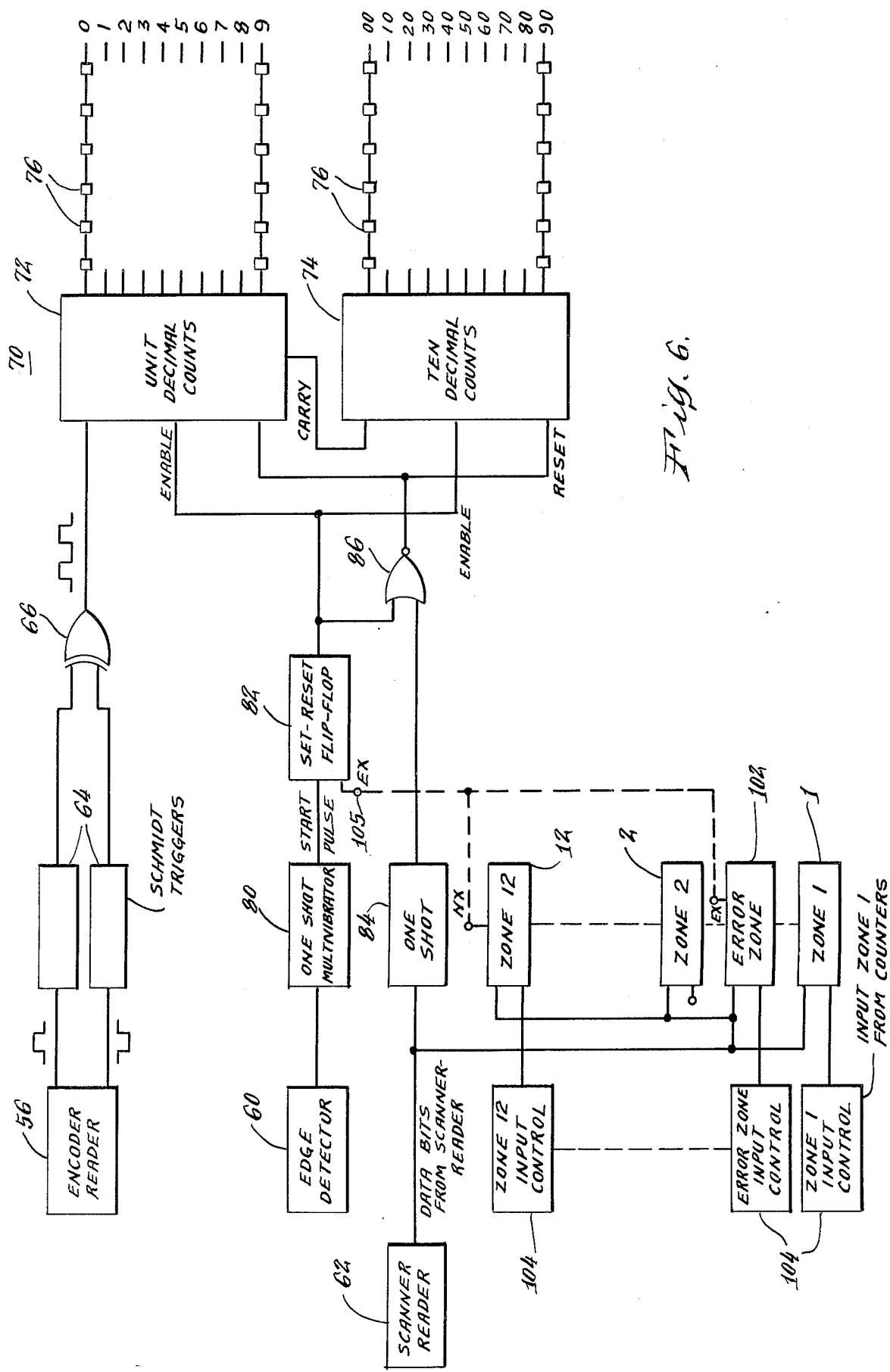
FIG. 6 is a schematic block diagram illustrating one form of circuitry which may be utilized to provide control function information from control function indicia appearing on a document of the type shown in FIG. 3 in accordance with the process and apparatus embodied in the present invention.

One way of carrying out the aforesaid process is illustrated in FIG. 6. The encoder reader 56 generates two square wave signals in quadrature which are applied to a pair of Schmitt triggers 64 for resquaring the signals applied thereto, and thus insuring noise immunity of the circuits which follow. The two signals are applied to an exclusive OR gate 66, thereby doubling the incoming pulse rate which is applied and stored in a counter 70. The counter 70 is illustrated as comprising a unit decimal counter 72 and a ten decimal counter 74. The counter 70 counts the encoder output pulses and provides a decimal decoded output to terminals 76, indicated by boxes (six per row). The decimal decoded outputs at terminals 76 of the counters 72 and 74, respectively, are used to control the opening and closing of data windows, as will be described hereinafter.

The edge detector 60 is coupled to a one-shot multivibrator 80, which is coupled to a set-reset flipflop 82. The set-reset flipflop 82 is coupled to the enable terminals of counters 72 and 74, and to one input of a two-input NOR gate 86. When a document in transit in the feeder 20 activates the edge detector 60, the one-shot multivibrator 80 fires, producing a start pulse which sets the set-reset flipflop 82 and resets the counters 72 and 74.

The scanner reader 62 is coupled to a one-shot multivibrator 84 which is in turn coupled to the NOR gate 86. The output from the scanner reader 62 is also coupled to a plurality of zones 1 – 12, and an error zone 102, which all provide data windows for identifying and categorizing data bits produced from the scanner reader 62. Each of the zones is provided with input control means 104. The input control circuit 104 has two inputs which are connected by program jumpers to the counter's decimal output terminals 76, with one zone input connecting to the unit counter 72 and the other to the tens counter 74. Accordingly, each zone 1 – 12 may be sequentially opened and closed under control of the counter 70. In one aspect of the present invention, however, the error zone 102 is opened under control of zone 1 and closed under the control of the counter for reasons which will be explained hereinafter. Error zone 102 has an EX output terminal, and zone 12 has an NX output terminal. The output at EX and NX terminals indicates the closing of those zones. The NX and EX output terminals are coupled to terminal 105 of the flipflop 82 for the resetting of the flipflop, and accordingly, for disabling the counter 70 to prevent a second cycle. This ends the scan cycle of the machine.

In operation, before a first data bit is detected by the scanner reader 62, and after the document in the feeder 25 has actuated edge detector 60, zone 1 is programmed ON by the connection between the counter 70 and the zone 1 input control 104. If a data bit has been detected by the scanner reader 62 and applied to the data window established by zone 1, the first data window has an output which can be stored and utilized for a control function operation of the inserter machine. At the same time, the first data bit, which is stored externally in another circuit (not shown), fires one-shot multivibrator 84, which resets the counter 70 to zero. The first data window is closed, and subsequent data windows are allowed to open as directed by the re-zeroed counter 70. As the document 25 proceeds under the scanner reader 62, additional windows are opened and closed in turn, each window being accurately measured from the first data bit and not from an inaccurate document edge. When the last window of zone 12 closes, or the last used zone closes (12X or NX), the counter is inhibited, and the scan cycle is complete. If, on the other hand, no data bits are detected in zone 1, the first data window is closed as programmed by the counter, as distinguished from being inhibited by the first data bit. The programmed close of the first data window opens a special large window which is an error window provided by error zone 102. This allows the scanner reader 62 to scan for data bits where none should appear. The subsequent occurrence of a data bit during the error window (which in fact is an error), produces an output from the error zone 102. This may be utilized to provide machine stoppage. If no bits occur during the error window on program close from the counter 70, the output from the EX terminal of the error zone 102 inhibits the counter 70 as the scan cycle is complete.

FIG. 7 illustrates one form of circuitry for providing data windows and scanning for data bits which is illustrated in block form in FIG. 6. The zone control circuit 104 has a pair of input terminals 111 which are jumpered to the proper counts of the counter 70, and applied to a two-input NAND gate 106. Inputs $\overline{111}$ of circuit 104 are likewise applied to a two-input NAND gate 107. The outputs of NAND gates 106 and 107 are coupled to zone 1 which includes a two-input NOR gate 113, one input of which is coupled to the output of NAND gate 106 and an input 108 coupled to line 99 which couples data bits from the scanner reader 62. A two-input NOR gate 115 has one input thereof coupled to the output of NAND gate 107 and an input 110 coupled to line 99. The output of NOR gates 113 and 115 are coupled to a set-reset flipflop 116 which includes NOR gates 117 and 118. One output of the flipflop 116 provides a zone output from which detected data bits are fed, and another output is applied through a transistor 120 to a light-emitting diode 122, which functions to indicate when zone 1 is in operation. The error zone 102 consists of a NOR gate 126 having an input 125 coupled to line 99 and another input coupled to NAND gate 124. Since the error zone 102 is automatically opened by the program closure of zone 1, the program opening of the error zone is not provided, but program closing is provided by $\overline{E}$ terminals which are connected to the counter 70 and to a NAND gate 124 whose output is coupled to the NOR gate 126. The error zone includes a flipflop 130 comprised of NOR gates 131 and 132. Flipflop 130 is coupled to the flipflop 116 via an input terminal of NOR gate 132, and is also coupled to NOR gate 126 by NOR gate 131, which has one input terminal 129 coupled to line 99. A closure EX output terminal is also provided on the error zone 102. Input terminal 129 of NOR gate 131 is also coupled to a NAND gate 134 which functions to inhibit the remaining zones 2 – 12 while zone 1 or the error zone 102 is functioning. A capacitor 135 is connected to the output of NAND gate 134 for a purpose to be described hereinafter. Other than the capacitor 135, the remaining input control circuitry 104 and zones 2 – 12 may be the same as that illustrated for zone 2.

Merely as an example for the operation of the circuit shown in FIG. 6, terminals 111 and $\overline{111}$ of the zone 1 input control circuit 104 are connected to predetermined decimals of units and tens counters 72 and 74, respectively. Before a data bit appears via line 99 from the scanner reader 62, the 108, 110, 125 and 129 inputs of NOR gates 113, 115, 126 and 131, respectively are low (no inhibit). When the selected count fed to terminals 111 from the counter 70 is reached, both inputs to NAND gate 106 go high, opening zone 1 and setting flipflop 116 via NOR gate 113. Transistor 120 conducts, and lights LED 122, indicating that zone 1 is in operation. Zone 1 provides a data window to allow a data collection circuit (not shown) to scan for the first data bit contained in the control function indicia 26 on the document 25. If no data bit is detected by the scanner reader 62, zone 1 closes when the counter 70 advances to the number (distance) programmed for zone 1 close, and applied at $\overline{111}$ inputs. NAND gate 107 goes high, and flipflop 116 is reset via gate 115. Also, flipflop 130 of the error zone 102 is set, lighting LED 133 to indicate that the error zone 102 is active. Accordingly, count control close of zone 1 automatically opens error zone 102, which is used to scan for data bits where none should appear. If a data bit occurs during the error window, the output from the error zone 102 may be used to stop the machine because an error has occurred. In the case described above, namely no occurrence of a first data bit, zone 1 and error zone 102 are not inhibited, but all other zones are inhibited by NAND gate 134.

However, if a first data bit is detected when the first data window is opened during the "on" time of zone 1, the counter is reset to zero and zone 1 is inhibited. Since the program close of zone 1 is never reached, error zone 102 will not open, and at any rate error zone 102 is inhibited. After a short time delay caused by the capacitor 135 coupled to the output of NAND gate 134, all other zones are allowed to function as programmed from the counter 70. These zones 2 - 12 will open and close as dictated by the program provided thereto by the counter 70. Data bits from the data windows formed by the zones as they are selectively opened and closed are gathered and utilized to control the operation of the other feeders of the inserting machine shown in FIG. 1. As is shown in FIG. 6, jumpers are connected from the error zone close EX and the last zone used, labelled NX (where N is the number of zones utilized), to input 105 of set-reset flipflop 82 for disabling the counter 70 to prevent a second scan cycle and thus end one cycle of operation and ready the apparatus for the detection of the next leading edge 24 of a document 25 as it is fed from the feeder 20.

A process and apparatus have thus been provided for accurately identifying control function indicia printed on a document regardless of the problems associated with the spacing of the indicia from the leading edge of the document. Once the first data bit has been identified, all subsequent data information is related to the distance from the first data bit, eliminating a host of problems associated with the detection and recognition of control function indicia on a document.

Since other modifications and changes, varied to fit particular operating requirements and environments, will be apparent to those skilled in the art, the invention is not considered limited to the examples chosen for purposes of illustration, and covers all changes and modifications which do not constitute a departure from the true spirit and scope of this invention.

What is claimed is:

1. In an inserting machine having a high speed feeder with a demand roller for feeding therefrom documents having control function indicia thereon, the improvements comprising
   a. edge detector means for detecting the edge of a document in the demand roller of said feeder,
   b. encoder reader means operatively coupled to said demand roller for generating timing signals in accordance with the surface speed of said demand roller,
   c. storage means receiving said timing signals from said encoder reader means which is operatively coupled thereto, said storage means storing and converting said signals into distance signals in accordance with the movement of said document through said high speed feeder,
   d. means for coupling said edge detector means to said storage means for enabling said storage means when a document is detected by said edge detecting means, e. scanner reader means for scanning the control function indicia on said documents and generating data bit outputs in accordance with the control function indicia on said documents, f. a plurality of data window means coupled to and controlled by said storage means, said scanner reader coupled to said plurality of data window means, and g. means for coupling a first data bit output of said scanner reader means to said storage means for resetting said storage means on the occurrence of said first data bit after said edge detector means is enabled, whereby the programming control of any subsequent data windows is based on the distance from said first data bit.

2. The structure set forth in claim 1 wherein said plurality of data windows include a large error window, means for opening said large error window on the programmed close of a first data window for said plurality of data error windows without the occurrence of a data bit therein, said error window coupled to said storage means for the programmed close thereof.

3. The structure set forth in claim 1 wherein said storage means comprises a resettable counter means.

4. The structure set forth in claim 1 wherein said encoder reader comprises a motor-driven encoder disk having interrupter means mounted adjacent thereto for generating said timing signals, said motor being coupled to a shaft for driving said demand roller whereby said timing signals are produced in accordance with the speed of said demand roller.

5. The structure set forth in claim 4 wherein said storage means comprises a resettable counter.

6. In an inserting machine having a high speed feeder with a demand roller for feeding documents therefrom having control function indicia thereon, the improvements comprising a. encoder reader means coupled to said demand roller for generating timing pulses in accordance with the speed of said demand roller, b. counter means having said timing pulses applied thereto for providing decimal decoded output signals therefrom thereby converting said timing pulses from a time measurement to a distance measurement represented by said decimal decoded output signals, c. edge detector means coupled to said counter for detecting the edge of a document in said demand roller and resetting said counter means on the detection of said edge, d. scanner reader means for scanning the control function indicia on said documents and generating data bit outputs in response to said control function indicia, e. a plurality of data window means including a first data window means coupled to and programmed to open and close in accordance with the decimal decoded output signals coupled thereto from said counter means, f. means for coupling the data bit outputs from said scanner reader to said plurality of data window means, and g. means coupled to said counter means in response to a first data bit output from said scanner reader means for resetting said counter means whereby the programming of all of said plurality of data window means subsequent to said first data window means are measured from the time of said first data bit.

7. The structure set forth in claim 6 including an error window means coupled to said first data window means and said counter means, means for opening said error window means in the absence of a first data bit occurring during the time interval of said first data window, and means coupled to said counter means for resetting said counter means on the programmed close of said error window means.

8. The structure set forth in claim 6 including means for coupling the close of the last of said plurality of data window means to said counter for resetting said counter at the end of a cycle of operation.

9. The process of controlling a mail inserting machine having a plurality of operating stations therein including a high speed feeder for feeding documents bearing control function indicia thereon, comprising the steps of a. detecting the leading edge of said document bearing control function indicia thereon, b. generating timing signals in accordance with the speed of travel of said document through said high speed feeder, c. scanning the control function indicia on said document after detecting the leading edge of said document and generating data bits in accordance with said control function indicia, d. storing and recycling said timing signals on the occurrence of a first data bit thereby converting said timing signals to distance signals and providing an accurate distance measurement between the occurrence of said first data bit and subsequent data bits, and e. forming a plurality of programmed data windows under the control of said distance signals and providing control function outputs therefrom on the occurrence of a data bit in a given data window.

10. The process set forth in claim 9 including the steps of forming a large error window after the programmed close of the first data window which is automatically closed by said distance signals after a predetermined interval.

* * * * *